United States Patent
Wu et al.

(10) Patent No.: US 8,049,739 B2
(45) Date of Patent: Nov. 1, 2011

(54) LIQUID CRYSTAL DISPLAY WITH A LIQUID CRYSTAL TOUCH PANEL HAVING PHOTO-SENSING ELEMENTS

(75) Inventors: Jeng-fang Wu, Hsin-Chu (TW); Cheng-han Tsao, Hsin-Chu (TW); Yen-ting Chen, Hsin-Chu (TW); Yi-pai Huang, Hsin-Chu (TW); Ting-jui Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 949 days.

(21) Appl. No.: 11/735,745

(22) Filed: Apr. 16, 2007

(65) Prior Publication Data
US 2008/0055262 A1 Mar. 6, 2008

(30) Foreign Application Priority Data
Aug. 31, 2006 (TW) .............................. 95132256 A

(51) Int. Cl.
*G06F 3/042* (2006.01)
(52) U.S. Cl. ..................................................... 345/175
(58) Field of Classification Search .................. 345/104, 345/173, 175
See application file for complete search history.

(56) References Cited

U.S. PATENT DOCUMENTS

| | | |
|---|---|---|
| 2004/0169625 A1 | 9/2004 | Park et al. |
| 2005/0212774 A1* | 9/2005 | Ho et al. ........................ 345/173 |
| 2006/0017710 A1 | 1/2006 | Lee et al. |
| 2006/0125971 A1* | 6/2006 | Abileah et al. ................. 349/42 |
| 2007/0013819 A1* | 1/2007 | Pak et al. ........................ 349/12 |

OTHER PUBLICATIONS

IDW/AD'05 AMD 10-2 Touch Panel Function Integrated LCD using LTPS Technology, 2005.

* cited by examiner

*Primary Examiner* — Chanh Nguyen
*Assistant Examiner* — Jonathan Blancha

(57) ABSTRACT

A liquid crystal display includes a light source for emitting light, a first substrate, a second substrate parallel to and facing the first substrate, and a plurality of pixel units formed between the first substrate and the second substrate. At least one pixel unit comprises a reflecting element disposed on the first substrate for reflecting light from the light source, and a photo-sensing element, formed on the second substrate, for outputting a sensing parameter based on light reflected from the reflecting member. Each reflecting element is extended out of the first substrate and faces to one of the plurality of photo-sensing elements. A position of the force applied on the first substrate is determined by detecting a variation of the sensing parameter outputted by the photo-sensing element.

8 Claims, 4 Drawing Sheets

LIQUID CRYSTAL DISPLAY WITH A LIQUID CRYSTAL TOUCH PANEL HAVING PHOTO-SENSING ELEMENTS

BACKGROUND OF INVENTION

1. Field of the Invention

The present invention relates to a liquid crystal display, and particularly relates to a touch-control liquid crystal display.

2. Description of Prior Art

More and more advanced-function displays have found their applications in current consumer electronic products. In particular, liquid crystal displays (LCDs) having a high-resolution color screen are more widely applied in various electronic devices, such as televisions, mobile phones, personal digital assistances (PDAs), digital cameras, desktop computer screens, and notebook computer screens.

To facilitate portability and usage of these devices, the LCDs with an LCD touch panel to allow direct touch by the users have become the trend in the LCD market. Conventional resistor type or capacitor type LCD touch panels, which are configured by disposing additional resistors or capacitors on the panels, determine the coordinate positions of touch-points by detecting the voltage variation at the touch positions. However, since the resistors and capacitors are directly disposed on the panels, light transmittance through the LCD panel will be decreased and the overall thickness of the LCD panel will be increased. Another type of LCD touch panel, called an optical touch panel, is configured by disposing a large amount of light sources and corresponding optical detecting elements around an LCD panel. The position of a touch-point is determined when determining the position of an optical detecting element has failed to receive light rays from a corresponding light source. Although this design would not decrease the overall light transmittance through the panel, the product size is significantly increased.

Accordingly, a touch-control LCD with detecting elements incorporated into a touch panel thereof is desirable to decrease the weight and volume of the LCD and thus meets the compact demand of the LCD market.

SUMMARY OF INVENTION

It is therefore an object of this invention to provide a touch-control LCD having photo-sensing elements directly disposed within the liquid crystal panel that allows direct touch by the user. A position of a touch point of the LCD panel which the force is applied on is determined by using the photo-sensing element to detect the light intensity.

In another aspect of the present invention, there is provided a liquid crystal display comprising a light source for emitting light, a first substrate, a second substrate parallel to and facing the first substrate, and a plurality of pixel units formed between the first substrate and the second substrate. At least one pixel unit comprises a reflecting element disposed on the first substrate for reflecting light from the light source, and a photo-sensing element, formed on the second substrate, for outputting a sensing parameter based on light reflected from the reflecting member. A position of the force applied on the first substrate is determined by detecting a variation of the sensing parameter outputted by the photo-sensing element.

These and other objectives of the present invention will become apparent to those of ordinary skill in the art after reading the following detailed description of the preferred embodiment, which is illustrated in the various figures and drawings.

DETAIL DESCRIPTION OF THE PREFERRED EMBODIMENT

Figure 1:
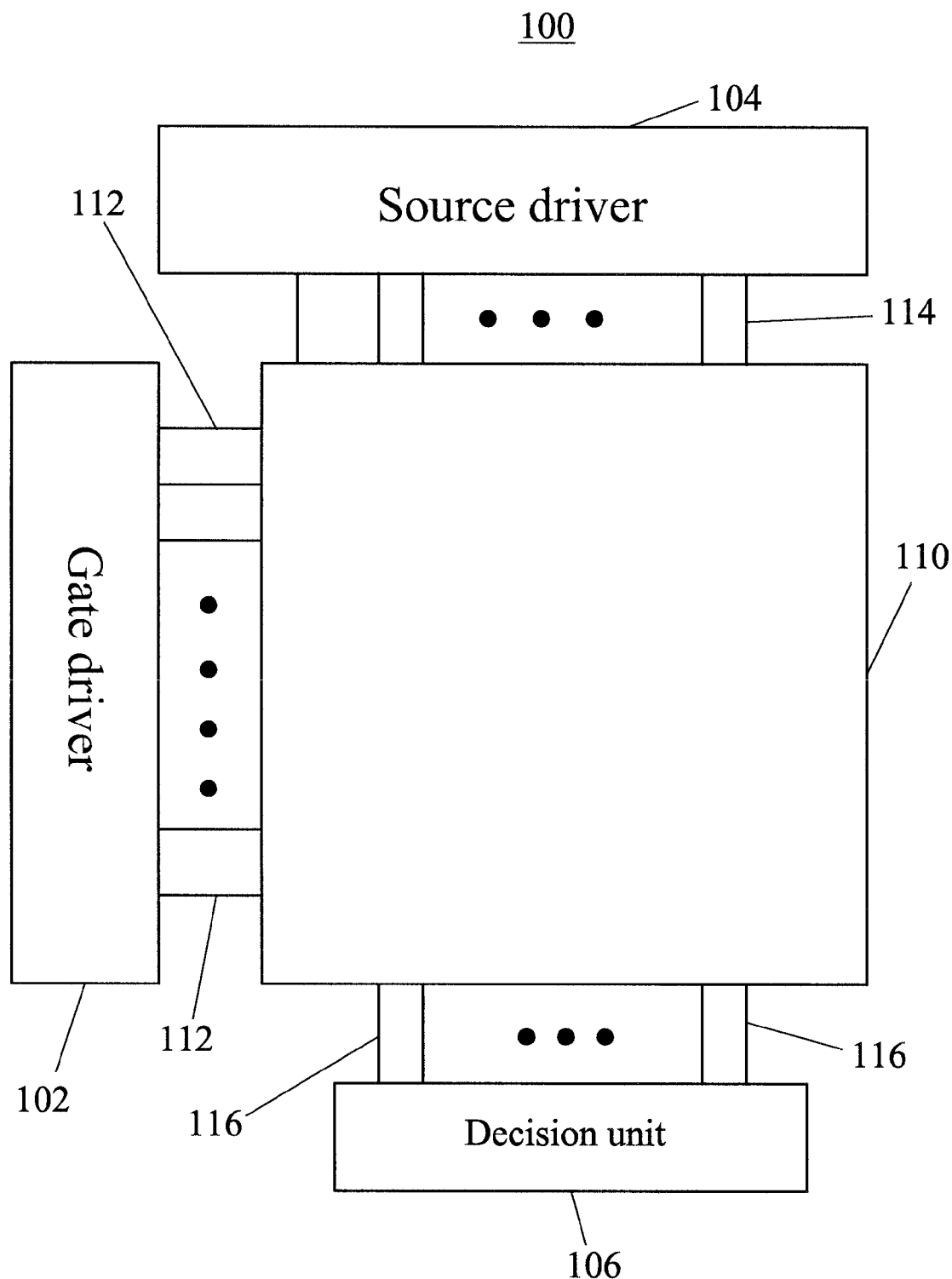
FIG. 1 is a schematic diagram of a liquid crystal display in accordance with the present invention.

FIG. 1 is a schematic diagram of a liquid crystal display 100 in accordance with one embodiment of the present invention. The liquid crystal display 100 comprises a light source (not shown in FIG. 1), a gate driver 102, a source driver 104, a decision unit 106, and a liquid crystal panel (LCD panel) 110, all of which are enclosed by a case (not shown). The gate driver 102 is used for providing a scanning signal to the LCD panel 110 via scan lines 112. The source driver 104 is used for providing a data signal voltage to the LCD panel 110 via data lines 114. The decision unit 106, coupled to the LCD panel 110 via transmission lines 116, is used for determining a position of the LCD panel 110 on which a force is applied. The light source may be Cold Cathode Fluorescent Lamps (CCFLs) for generating required backlight for the LCD panel 110.

Figure 2:
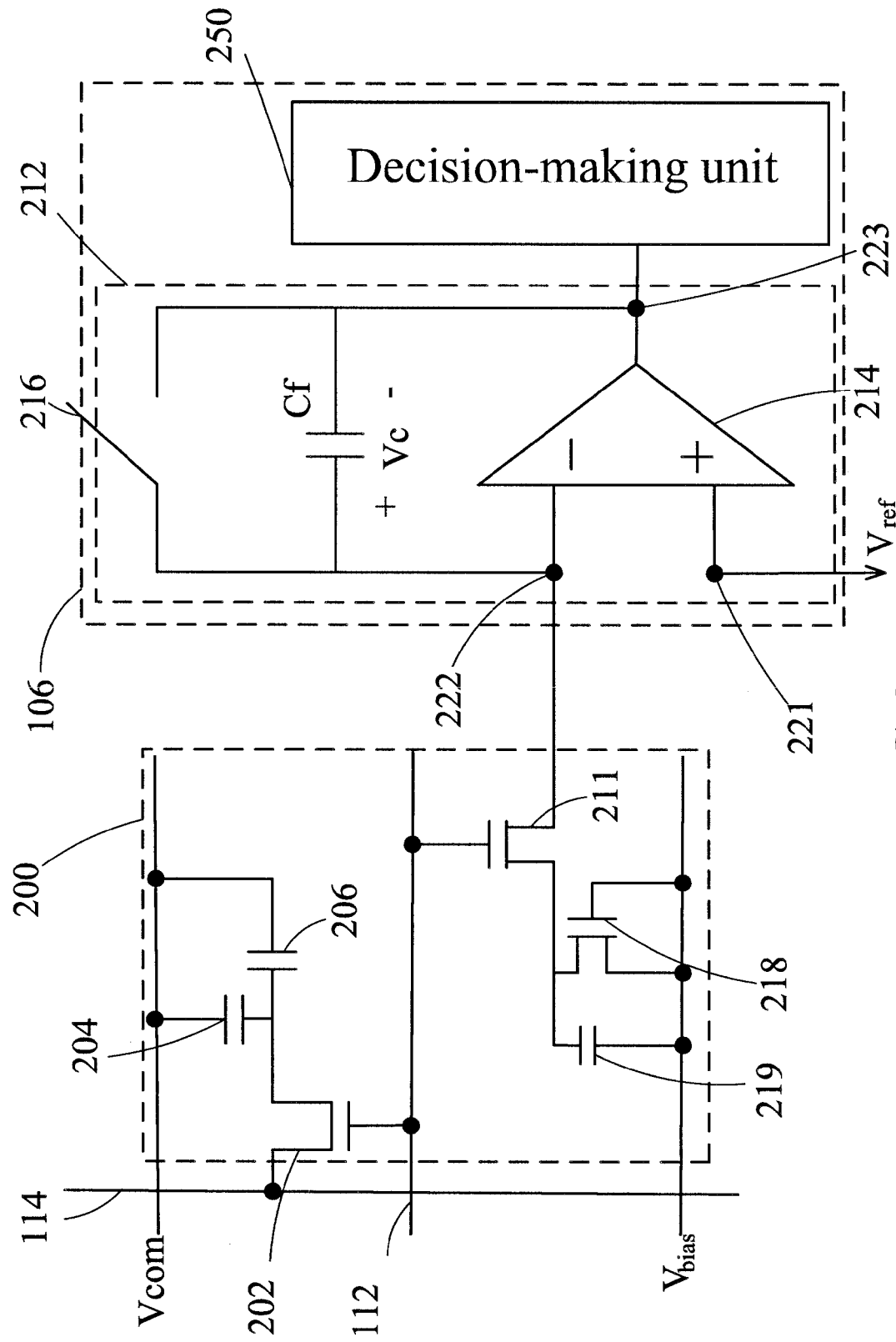
FIG. 2 illustrates a circuit diagram of the LCD panel and the decision unit depicted in FIG. 1.

Referring to FIG. 2 illustrating a circuit diagram of the LCD panel 110 and the decision unit 106 depicted in FIG. 1, the LCD panel 110 comprises a plurality of pixel units 200, and each pixel unit contains a switch transistor 202, a storage capacitor 204, and a liquid crystal capacitor 206. The liquid crystal capacitor 206 is formed by two electrodes, in which one electrode is coupled to a common voltage end Vcom, and the other electrode is coupled to the switch transistor 202. Liquid crystal molecules are sandwiched between the two electrodes. When the gate of the switch transistor 202 receives the scan signal generated by the gate driver 102 via the scan line 112, the data signal voltage generated by the source driver 104 is conducted to the liquid crystal capacitor 206 through the data line 114. According to the voltage difference between the common voltage at the common voltage end Vcom and the data signal voltage, the liquid crystal molecules of the liquid crystal capacitor 206 are reoriented for controlling the light intensity transmitted through the liquid crystal molecules. The storage capacitor 204 is adapted to store the data signal voltage, so that the liquid crystal capacitor 206 may still maintain the voltage difference between the data signal voltage and the common voltage even when the switch transistor 202 is turned off, thereby maintaining the light intensity transmitted through the liquid crystal molecules. The LCD panel 110 has a plurality of transistors 211 and a plurality of photo-sensing elements 218 for generating sensing parameter based on the received light intensity. The photo-sensing element 218, such as a photo transistor, is coupled to a bias end Vbias and is used for generating a sensing current (i.e. the sensing parameter) based on the received light intensity. The transistor 211 is used for conducting the sensing current generated by the photo-sensing element 218 when turned on. Additionally, the pixel unit 200 further comprises a storage capacitor 219 for storing the sensing current generated by the photo-sensing element 218.

Figure 3:
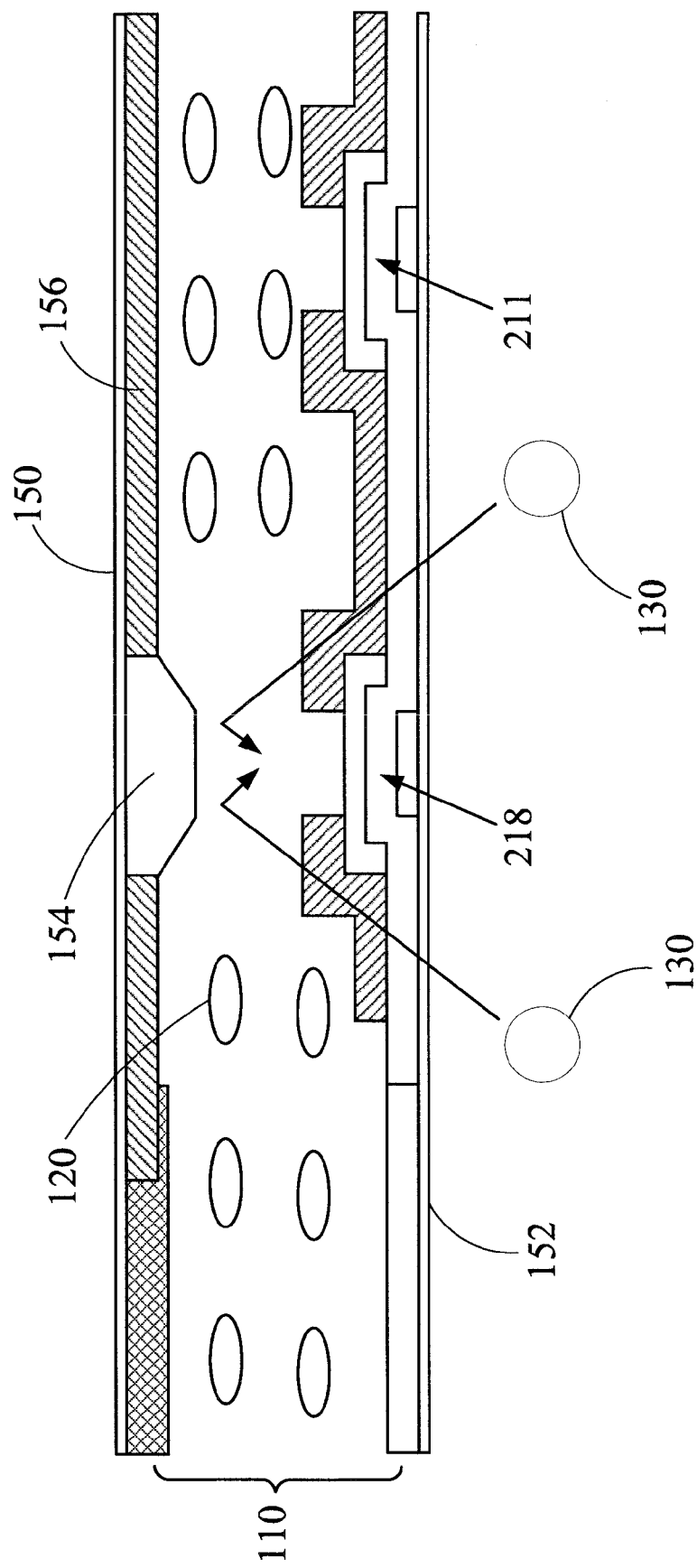
FIG. 3 illustrates a partial structure of the liquid crystal panel depicted in FIG. 1.
Figure 4:
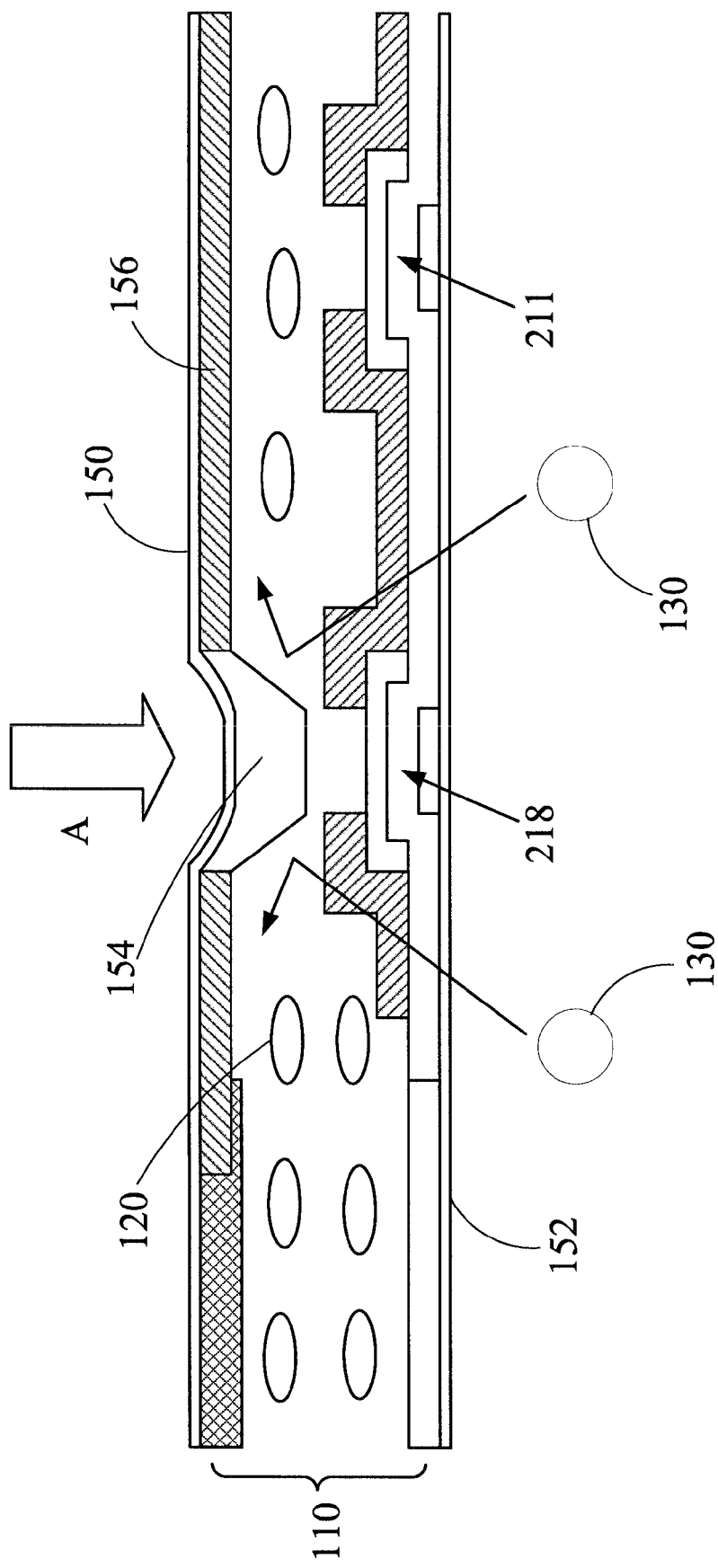
FIG. 4 shows a diagram of the LCD panel applied by the force A.

With reference to FIG. 3 illustrating a partial structure of the liquid crystal panel 110 depicted in FIG. 1, and FIG. 4 showing a diagram of the LCD panel 110 applied by the force A, the LCD panel 110 comprises a first substrate 150, a second substrate 152 and a black matrix layer 156. Preferably, the first substrate 150 and the second substrate 152 are transparent conducting substrates. The pixel units 200 are formed between the first substrate 150 and the second substrate 152. Each pixel unit 200 comprises a photo-sensing element 218 formed on the second substrate 152, and a reflecting element 154 extended out of the first substrate 150 for reflecting light emitted from the light source 130. Each reflecting element 154 is facing one of the photo-sensing elements 218. Preferably, the reflecting element 154 is made of metal with high reflecting coefficient. The black matrix layer 156, which may be made of resin, is formed on the first substrate 150 but not facing the plurality of photo-sensing elements 218, for blocking the light emitted from the light source 130. Liquid crystal molecules 120 are sandwiched between the first substrate 150 and the second substrate 152. As shown in FIG. 3, if there is no pressure on the first substrate 150, the photo-sensing element 218 can easily receive light from the light source 130. By contrast, as shown in FIG. 4, when the force A is applied on a touch point on the first substrate 150, the distance between the first substrate 150 and the second substrate 152 at the touch point is shortened. In the meantime, light from the light source 130 is reflected outwardly by the reflecting element 154, thereby causing a less amount of light to be received by the photo-sensing element 218. The photo-sensing element 218 can generate sensing current based on the light intensity. In other words, the greater the light intensity is, the stronger the sensing current generated by the photo-sensing element 218 is. As a result, the photo-sensing element 218 can output stronger sensing current when the force A not to be applied on the touch point (as depicted in FIG. 3) than the force to be applied on the touch point (as depicted in FIG. 4).

Referring to FIG. 2, the photo-sensing element 218 generates a sensing current based on different light intensity, and outputs the sensing current to a conversion circuit 212. The conversion circuit 212 includes an operational amplifier 214, a feedback capacitor Cf and a switch unit 216. The operational amplifier 214 has a first input terminal 221, a second input terminal 222 and an output terminal 223. The first input terminal 221 is coupled to a reference voltage terminal $V_{ref}$ that is adapted to provide a direct current reference voltage, e.g. 5V. The conversion circuit 212 may be regarded as an integrating circuit. When the scan line 112 delivers a scan signal, the switch unit 216 will be turned off. In contrast, when the scan line 112 does not deliver a scan signal, the switch unit 216 will be turned on, whereby a short circuit occurs between the second input terminal 222 and the output terminal 223, resulting in the voltage at the output terminal 223 is equal to the reference voltage $V_{ref}$. When the switch unit 216 is turned off, the output Vout at the output terminal 223 of the operational amplifier 214 is expressed by:

$$Vout = -Vc = -\frac{I \times t}{Cf}, \qquad \text{Equation 1}$$

where Vc indicates the voltage across the capacitor Cf, I indicates the sensing current generated by the photo-sensing element 218, and t indicates a time period.

Afterwards, the operational amplifier 214 converts the sensing current generated by the photo-sensing element 218 into a sensing voltage. Because a smaller amount of sensing current is generated by the photo-sensing element 218 corresponding to the touch point which a force is applied on, a smaller amount of the sensing voltage is converted by the operational amplifier 214. Consequently, the decision-making unit 250 receives all the sensing voltages outputted by the operational amplifiers 214, and determines the corresponding position of the touch point of the LCD panel 110 which the force is applied on.

Forces with different magnitude applied on the first substrate 150 cause variations of distance between the first substrate 150 and the second substrate 152, as well as the light intensity received by the photo-sensing element 218 and its output sensing current. Accordingly, the output voltage of the operational amplifier 214 is also varied based on the output sensing current of the photo-sensing element 218. Consequently, in addition to determining the position of the touch point of the LCD panel 110, the decision-making unit 250 also can determine the magnitude of the force which is applied on the touch point based on the output voltages of the operational amplifiers 214.

The liquid crystal display, according to the present invention, integrates a plurality of photo-sensing elements into a liquid crystal panel thereof. By detecting the voltage variations resulting from the light intensity differences, corresponding coordinate positions of the touch point of the liquid crystal panel can be determined. Since the photo-sensing elements are integrated into the liquid crystal panel, not only the weight and size of the liquid crystal display are decreased as compared with conventional liquid crystal display using an optical type touch panel, but also the current compact trend of liquid crystal display products is matched as well.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display comprising:
   a light source for emitting light;
   a first substrate;
   a second substrate parallel to and facing the first substrate; and
   a plurality of pixel units formed between the first substrate and the second substrate, at least one of the pixel units comprising:
   a reflecting element, disposed on the first substrate, for reflecting light from the light source;
   a photo-sensing element, formed on the second substrate, for outputting a sensing parameter based on light reflected from the reflecting element, wherein each reflecting element is extended out of the first substrate and faces one of the plurality of photo-sensing elements, and wherein a touch point is determined based on a shortened distance between the reflecting element and the corresponding photo-sensing element in response to a loss of reflective light detected by the photo-sensing element when a force is applied on the reflecting element; and
   a black matrix layer formed on the first substrate without facing the plurality of photo-sensing elements, for blocking the light emitted from the light source,
   wherein the reflecting element is adjacent to the black matrix and is spaced apart from the black matrix to avoid ambient light entering the photo sensing elements, so that the reflecting element reflects backlight.

2. The liquid crystal display as claimed in claim 1, further comprising a decision unit for receiving the sensing parameter outputted from the photo-sensing element.

3. The liquid crystal display as claimed in claim 2, wherein the decision unit comprises:
   a plurality of integrating circuits, each for outputting a sensing voltage according to the sensing voltage; and
   a decision-making unit for comparing the sensing voltages of the plurality of integrating circuits and thus determining the source of the sensing voltage.

4. The liquid crystal display as claimed in claim 1, wherein each photo-sensing element comprises a photo transistor for generating the sensing parameter based on the light intensity of the light reflected from the reflecting element.

5. The liquid crystal display as claimed in claim 1, further comprising a plurality of transistors, each transistor being formed on the second substrate and coupled to one of the plurality of the photo-sensing elements, for delivering the sensing parameter to the decision unit.

6. The liquid crystal display as claimed in claim 1, wherein each photo-sensing element comprises a photo transistor for generating the sensing parameter based on the light intensity of the light reflected from the reflecting element.

7. The liquid crystal display as claimed in claim 6, wherein the decision unit comprises:
   a plurality of integrating circuits, each for outputting a sensing voltage based on the sensing parameter; and
   a decision-making unit for comparing the sensing voltages of the integrating circuits and thus determining the position of the force applied on the first substrate.

8. The liquid crystal display as claimed in claim 6, wherein the first and the second substrates are transparent substrates.

* * * * *